F. R. ROGERS & C. VALLONE.
MITER JOINT FOR TUBES.
APPLICATION FILED MAR. 29, 1909.

958,316.

Patented May 17, 1910.

2 SHEETS—SHEET 1.

Witnesses.
A. G. Dimond
E. A. Volk

Inventors.
Charles Vallone,
Frank R. Rogers
By Wilhelm, Parker & Hard,
Attorneys.

F. R. ROGERS & C. VALLONE.
MITER JOINT FOR TUBES.
APPLICATION FILED MAR. 29, 1909.

958,316.

Patented May 17, 1910.

2 SHEETS—SHEET 2.

Witnesses.
A. F. Dimond
E. A. Volk.

Inventors.
Charles Vallone,
Frank R. Rogers,
By Wilhelm, Parker & Hard,
Attorneys.

UNITED STATES PATENT OFFICE.

FRANK R. ROGERS AND CHARLES VALLONE, OF BUFFALO, NEW YORK, ASSIGNORS TO BARCALO MANUFACTURING COMPANY, OF BUFFALO, NEW YORK.

MITER-JOINT FOR TUBES.

958,316.   Specification of Letters Patent.   Patented May 17, 1910.

Application filed March 29, 1909. Serial No. 486,522.

*To all whom it may concern:*

Be it known that we, FRANK R. ROGERS and CHARLES VALLONE, citizens of the United States, residing at Buffalo, in the county of Erie and State of New York, have invented a new and useful Improvement in Miter-Joints for Tubes, of which the following is a specification.

This invention relates to miter joints for metal tubes such, especially, as are used in the construction of tubular metal bedstead frames.

The object of the invention is to provide an improved joint or connection of simple and inexpensive construction for fastening the ends of tubes that meet at an angle, which will securely and rigidly connect the tubes and enable them to be joined expeditiously; and also to provide a miter joint of neat and attractive appearance in which the tubes inclose and conceal the parts of the connection with the exception of an external finishing band which covers and hides the joint or crack between the meeting ends of the tubes.

Figure 1:
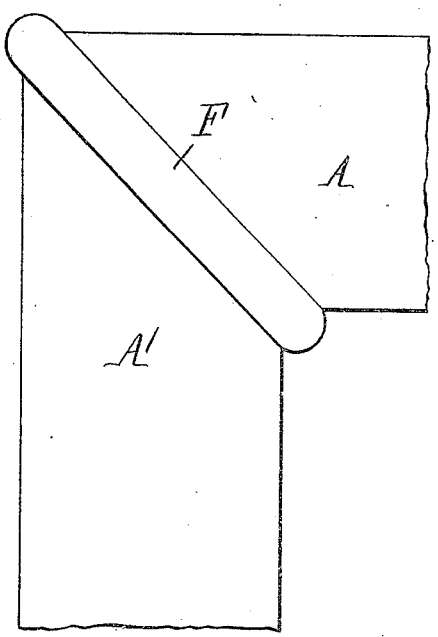
Figure 2:
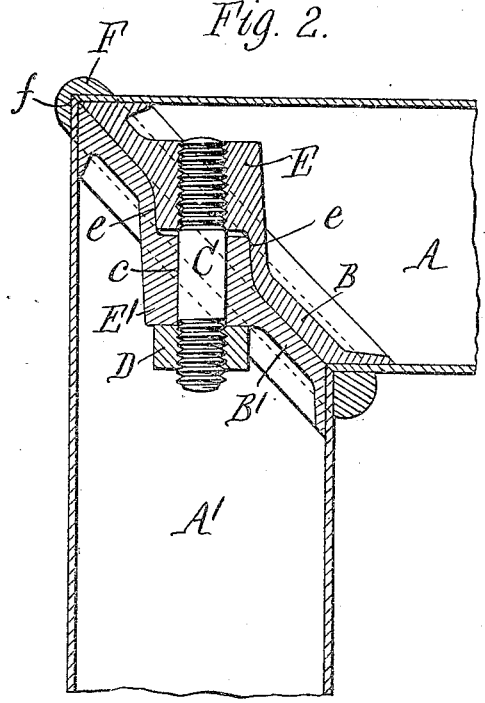
Figure 3:
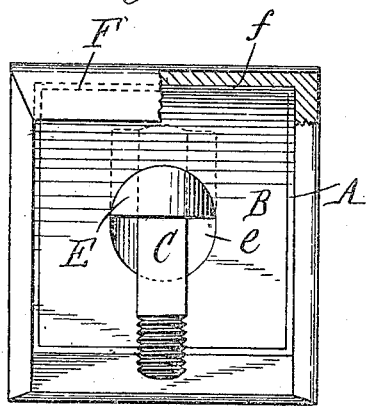
Figure 4:
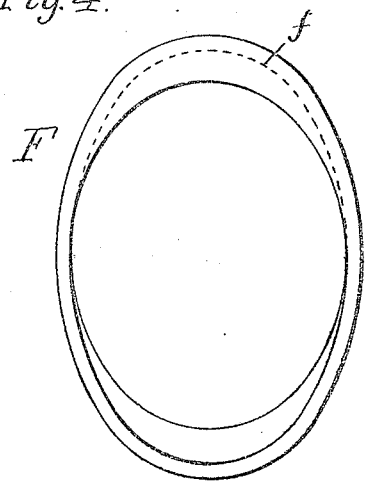
Figure 5:
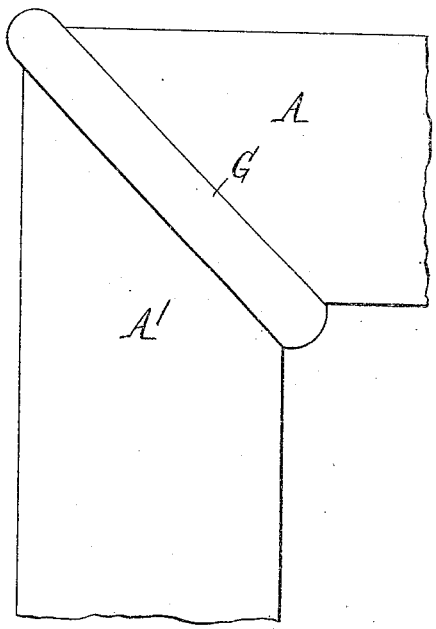
Figure 6:
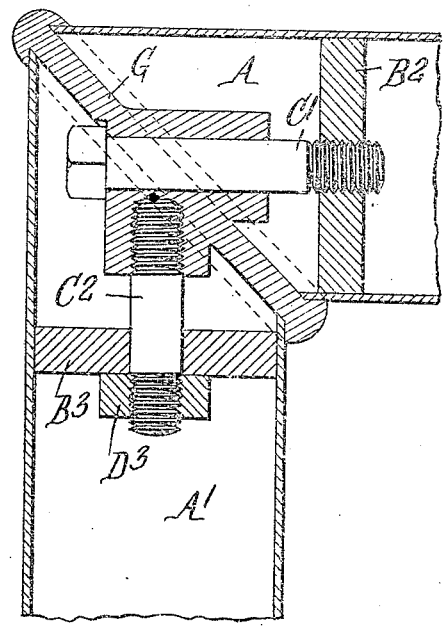
Figure 7:
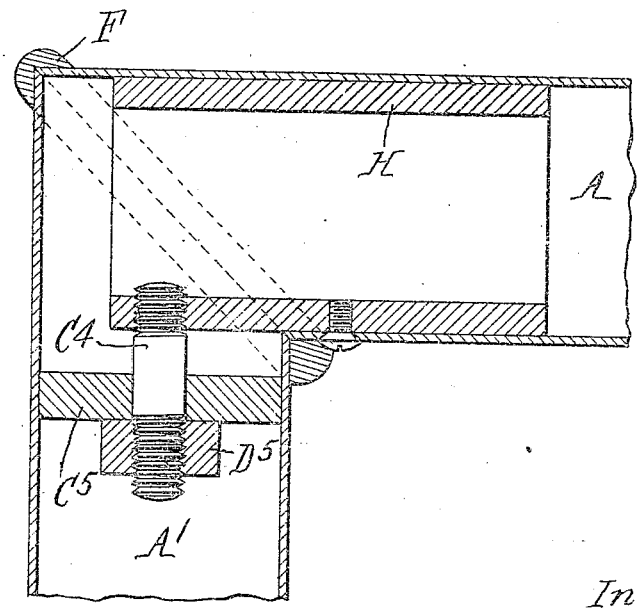

In the accompanying drawings, consisting of two sheets: Figure 1 is a side elevation of a miter joint embodying the invention. Fig. 2 is a longitudinal sectional elevation thereof. Fig. 3 is an end elevation of one of the tubes and its anchor piece, and showing the finishing band partly in section. Fig. 4 is an elevation of the joint band used with round tubes. Fig. 5 is a side elevation of a modified construction of the joint. Fig. 6 is a longitudinal sectional elevation thereof. Fig. 7 is a similar view of another modification.

Like letters of reference refer to like parts in the several figures.

Referring first to Figs. 1–4, A and A′ represent the adjacent portions of two tubes which join each other at an angle, the abutting ends of the tubes being mitered.

B and B′ represent two anchor pieces or members which are secured in the ends of the tubes A and A′, respectively. The anchor pieces, in this construction, consist of castings which are soldered in the tubes with their outer faces flush with the mitered ends of the tubes and adapted to bear one upon the other. A stud C secured to the anchor piece B in one of the tubes projects therefrom in the direction of the length of the other tube loosely through a hole c in the other anchor piece B′, and has a screw-threaded end adapted to receive a nut D, by tightening which the anchor pieces are drawn firmly together and securely held. The stud preferably consists of a bolt threaded at both ends and screwed tightly into a threaded hole in the anchor piece B, but it could be secured thereto in any other manner or be an integral part of the anchor piece. One of the anchor pieces is preferably formed with a cylindrical boss E in which the stud is secured, and the other anchor piece has a corresponding boss E′ containing the hole c through which the stud passes, and each anchor piece also has a seat or depression e to receive the end of the boss on the other anchor piece, so that the anchor pieces interlock with each other and the alined bosses abut end to end. This construction facilitates connecting the parts and prevents one anchor piece from slipping on the other when the nut is tightened, while the anchor pieces can be made light and yet afford long bearings for the connecting stud.

F represents an external finishing band which surrounds the joint between the meeting ends of the tubes, concealing the same and giving a neat and finished appearance to the joint. One end of this band is grooved at f and receives or embraces the outer corner of the tubes, while the other end of the band is shaped to fit into the angle at the inner corner of the tubes.

In assembling the parts the band F is placed in position on the end of the tube A and the other tube A′ is placed in position with its end within the band and the stud C projecting through the hole c in the anchor piece B′. The nut D is then placed on the end of the stud and screwed up tight by a suitable long wrench or tool inserted through the open end of the tube A′.

An ordinary bolt inserted through the hole c in the anchor piece B′ and screwed into the threaded hole in the other anchor piece B could be employed, but it would be more difficult to insert such a bolt, and the described construction employing the nut is preferred.

The connection described is suitable for tubes of either circular or polygonal cross-section. The anchor pieces and finishing band are made of different contours to correspond to the cross-sectional shape of the tubes with which they are to be used, but otherwise the construction of the parts is the same for tubes of different shapes. Figs. 1–3 show a square tube joint, and Fig. 4 a finishing band for a cylindrical tube joint.

In the construction shown in Figs. 5 and 6, the mitered ends of the tubes abut against the opposite sides of an angle or anchor piece G which is arranged between them and is secured on the end of one tube, for instance, the tube A, by a bolt C' inserted through a hole in the angle piece G and screwed into a threaded hole in an anchor piece B² which is secured in the tube A. The angle piece G is provided with a threaded stud C² which is adapted to be inserted through a hole in an anchor piece B³ secured in the other tube A' and to receive a nut D³. The angle or anchor piece G is first bolted on the end of the tube A, which leaves the stud C² projecting outwardly from the angle piece G in the direction of the length of the other tube and the angle piece thus corresponds to the anchor piece B in the first construction, although it is detachably, instead of permanently, secured to the tube A. The mitered end of the other tube A' is then placed in position against the angle piece with the projecting stud C² extending through the hole in the anchor piece B³ in this tube and the nut is screwed on the stud. In this construction, instead of the separate finishing band F, the angle piece is provided with integral rim flanges which embrace and conceal the ends of the tubes, giving the joint the same external appearance as in the first construction.

Fig. 7 shows a construction in which a short tubular core or anchor piece H is secured in one tube, A, with its outer end projecting beyond the inner edge of the mitered end of the tube. A stud C⁴ secured to the projecting end of the core extends through a hole in an anchor piece C⁵ secured in the other tube and is adapted to receive a nut D⁵. In this construction a separate finishing band F is employed like that used in the first construction.

All of the constructions described give the joint the same external appearance.

We claim as our invention:

1. The combination of two tubes arranged at an angle to each other and having abutting mitered ends, an anchor piece secured in the end portion of one of said tubes, an anchor piece secured to the end portion of said other tube, and a screw connection between said anchor pieces which extends within one of said tubes in the direction of the length of said tube through the anchor piece therein, and at an angle to the direction of the length of said other tube, whereby said screw connection may be tightened by a tool inserted into the former tube, said screw connection being completely concealed from view, substantially as set forth.

2. The combination of two tubes arranged at an angle to each other and having abutting mitered ends, an anchor piece secured in the end portion of one of said tubes, an anchor piece secured in the end portion of said other tube, a screw connection between said anchor pieces which extends within one of said tubes in the direction of the length of said tube through the anchor piece therein and at an angle to the direction of the length of said other tube, whereby said screw connection may be tightened by a tool inserted into the former tube, said screw connection being completely concealed from view, and a band which surrounds and conceals the joint between the mitered ends of said tubes, substantially as set forth.

3. The combination of two tubes arranged at an angle to each other and having abutting mitered ends, an anchor piece secured in the end portion of one of said tubes, an anchor piece secured in the end portion of said other tube, and a screw secured to said first anchor piece and extending therefrom through said other anchor piece in the direction of the length of said other tube and at an angle to the length of said first mentioned tube, said screw connection and said anchor pieces being completely concealed from view in said tubes, whereby said screw connection may be tightened by a tool inserted into said latter tube, substantially as set forth.

4. The combination of two tubes arranged at an angle to each other and having abutting mitered ends, an anchor piece secured in the end portion of one of said tubes, an anchor piece secured in the end portion of said other tube, and a screw secured to said first anchor piece and extending therefrom through said other anchor piece in the direction of the length of said other tube and at an angle to the length of the said first-mentioned tube, a nut on said screw, whereby said nut may be tightened by a tool inserted into said other tube, substantially as set forth.

5. The combination of two tubes arranged at an angle to each other and having abutting mitered ends, anchor pieces secured in the ends of said tubes substantially parallel with said mitered ends, a screw stud projecting from one of said anchor pieces through a hole in the other anchor piece, and a nut screwed on said stud, said stud and nut being inside of the tube and completely concealed from view, substantially as set forth.

6. The combination of two tubes arranged at an angle to each other and having abutting mitered ends, anchor pieces secured in the ends of said tubes substantially parallel with said mitered ends and having bosses which extend in line with each other in the direction of the length of one tube, and a screw connection for said anchor pieces which is secured in one of said bosses and passes through the other boss, said screw connection being concealed from view within the tubes, substantially as set forth.

Witness our hands, this 25th day of March, 1909.

FRANK R. ROGERS.
CHARLES VALLONE.

Witnesses:
C. W. PARKER,
C. B. HORNBECK.